Aug. 24, 1965     E. G. JAMES     3,202,528

HEAT-SEALABLE POLYPROPYLENE FILM AND METHOD FOR PRODUCING SAME

Filed Dec. 31, 1962

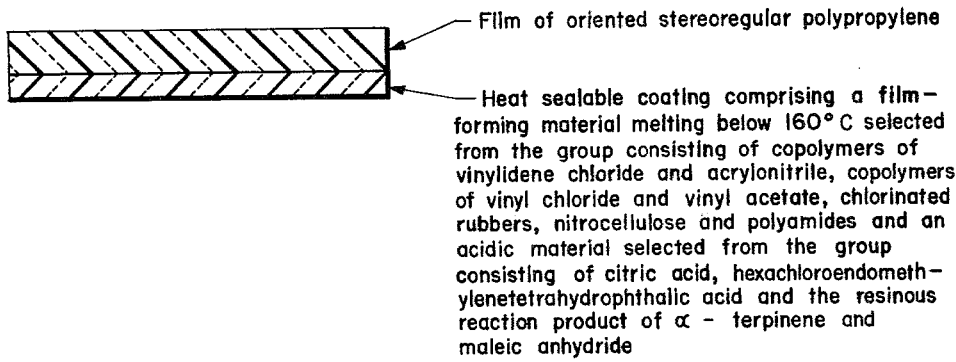

— Film of oriented stereoregular polypropylene

— Heat sealable coating comprising a film-forming material melting below 160° C selected from the group consisting of copolymers of vinylidene chloride and acrylonitrile, copolymers of vinyl chloride and vinyl acetate, chlorinated rubbers, nitrocellulose and polyamides and an acidic material selected from the group consisting of citric acid, hexachloroendomethylenetetrahydrophthalic acid and the resinous reaction product of $\alpha$ - terpinene and maleic anhydride

FIG. I

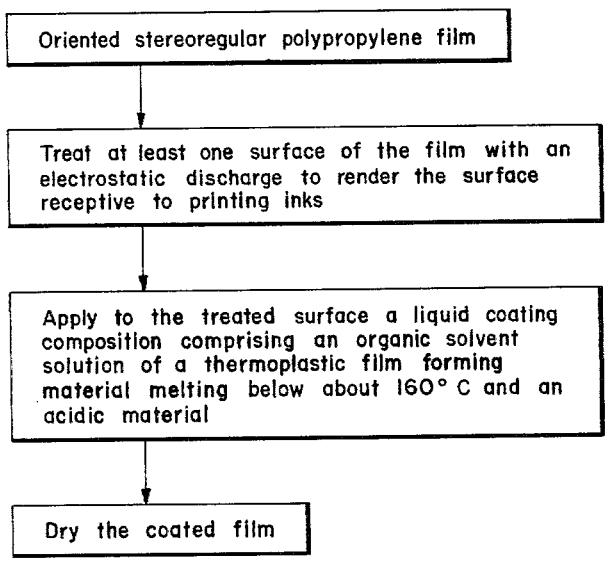

Oriented stereoregular polypropylene film

↓

Treat at least one surface of the film with an electrostatic discharge to render the surface receptive to printing inks

↓

Apply to the treated surface a liquid coating composition comprising an organic solvent solution of a thermoplastic film forming material melting below about 160° C and an acidic material

↓

Dry the coated film

FIG. 2

EARL G. JAMES
INVENTOR.

BY    Ernest G. Peterson

AGENT

United States Patent Office 3,202,528
Patented Aug. 24, 1965

3,202,528
HEAT-SEALABLE POLYPROPYLENE FILM AND METHOD FOR PRODUCING SAME
Earl Gordon James, Wilmington, Del., assignor to Hercules Powder Company, Wilmington, Del., a corporation of Delaware
Filed Dec. 31, 1962, Ser. No. 248,253
2 Claims. (Cl. 117—47)

The present invention relates to heat-sealable films of stereoregular polypropylene and to a method of coating polypropylene film with a heat-sealable coating which is strongly adherent to the film surface.

Stereoregular polypropylene, i.e., predominantly crystalline polypropylene, is a relatively new synthetic polymer that is finding wide acceptance in the plastics art. One of the most promising uses for this new polymer is in the manufacture of film, particularly oriented film, which in turn finds use in the packaging and related arts. For certain types of film, coatings which improve the barrier properties of the film and heat sealability are a requisite. While stereoregular polypropylene film can be heat-sealed to itself, the high temperature necessary for heat-sealing destroys orientation in an oriented film and causes film shrinkage.

One approach which has been made to solve the heat-sealing difficulties of oriented stereoregular polypropylene film is to provide the film with a coating of a material that is more heat sensitive and, hence, heat sealable, at a lower temperature than the film itself. This approach, however, has met with frustration because stereoregular polypropylene is unreceptive to the majority of lacquers and similar materials that are normally used as heat-sealable coatings on other films such as films of regenerated cellulose. The major problem in the case of stereoregular polypropylene is that of adhesion; in fact, the majority of coatings adhere so poorly to this polymer that they can be removed almost effortlessly by peeling or scraping.

In order to obtain better adhesion on stereoregular polypropylene film, attempts have been made to modify the surface properties of the film and thus make it receptive to heat-sealable coatings by the published methods for treating polyethylene and other synthetic polymers that result in an increase in the surface tension and render the polymer receptive to printing inks. Such methods included, for instance, heat and flame treatment, electrostatic discharge, chemical treatment with agents such as ozone, gaseous halogen, ultraviolet light, chromic acid, and mixtures of sodium dichromate and sulfuric acid. However, it quickly became apparent that pretreatments which render stereoregular polypropylene receptive to printing inks do not necessarily render it receptive to heat-sealable coating compositions. These prior art pretreatments improve the adhesion of most inks and coatings only to the extent that the adhesion of the coating to the polyolefin surface is greater than to a pressure sensitive tape and, hence, cannot be removed by a so-called "tape test." However, the adhesion level required with heat-sealable coatings in order to achieve maximum effectiveness, i.e., a degree of adhesion of the coating to the polyolefin surface equal to or greater than the cohesive force of the coating to itself when heat-sealed, is not obtainable with these prior art pretreatments, and the coatings (or inks) upon heat-sealing, peel and lift free from the treated polyolefin surface.

Attempts to improve the adhesion level by more drastic surface treatment such as with a high level of electrostatic discharge resulted in such serious blocking in the uncoated roll that further use of the film was impractical.

Various additives have also been proposed for modifying the properties of coating compositions and thus making them more adherent to surfaces. The conventional tackifiers and resins which are known to improve the adhesiveness of thermoplastic materials to wood, fibrous material, glass, porcelain, and the like, however, do not provide the necessary degree of adhesion of a heat-sealable coating to stereoregular polypropylene to prevent lifting of the coating after heat-sealing.

It has now been found that improved adherence of heat-sealable coatings to stereoregular polypropylene surfaces which have been treated with an electrostatic discharge to render the surface receptive to printing inks can be obtained by incorporating in the coating composition an acidic material selected from the group consisting of citric acid, hexachloroendomethylene tetrahydrophthalic acid and the resinous reaction product of $\alpha$-terpinene and maleic anhydride.

Accordingly, the present invention is directed to heat-sealable oriented polypropylene film and the method for producing the film comprising applying to at least one surface of the film a liquid coating composition comprising a solution in an organic solvent of a thermoplastic film-forming material having a melting point below about 160° C. and an acidic material selected from the group consisting of citric acid, hexachloroendomethylene tetrahydrophthalic acid, and the resinous reaction product of $\alpha$-terpinene and maleic anhydride, said acidic material being present in a compatible amount sufficient to promote adhesion of the coating to the film, and then drying the coated film.

A flow sheet of the process of the invention is illustrated by FIGURE 2 of the drawing and the coated film is illustrated by FIGURE 1.

The acidic materials of the present invention exhibit compatibility, to various extents, with thermoplastic film-forming materials melting below about 160° C. For purposes of the present invention, it is necessary that the acidic material be compatible with the film-forming material within the range employed. Although outside of this range the acidic material may produce a coating with good adherence, the coating itself will not have sufficient clarity to justify its use as a heat-sealable coating for oriented polypropylene film wherein film clarity is an important criterion.

The proportion of acidic material required in the coating composition to effect improvement in the adhesion of the coating to stereoregular polypropylene film lies within the range of about 20 to about 60% by weight of the film former material. Optimum improvement usually is attained by use of proportions within the range of about 35 to about 50% by weight of the film former, subject to minor variations due to the particular film former and the compatibility therewith of the acidic material employed.

The invention is best illustrated by reference to the following examples in which parts are by weight unless otherwise specified.

In the following examples the coated film was examined to determine the degree of adhesion of the coating and heat-sealing characteristics. Adhsion was evaluated by applying a strip of conventional transparent pressure-sensitive "cellophane" tape to the surface of the coated film with sufficient pressure to assure complete adhesion. The tape was then jerked from the surface and the adhesion gauged by observing what part, if any, of the coating was removed by the tape. In this test a rating of "good" or "G" was assigned if no coating was stripped from the film; a rating of "fair" or "F" if less than 10% of the coating was stripped; a rating of "poor" or "P" if more than 50% of the coating was stripped;

and a rating of "very poor" or "VP" if all of the coating was stripped from the film.

The heat-sealing characteristics were evaluated by heating-sealing the coated film (coated side facing side) employing a Sentinel Heat Sealer, Model No. 12–12 ASC, for 0.5 second at 300° F. and 20 p.s.i. pressure. The characteristics of the seal were then determined by pulling this seal apart by hand at an angle of 90° and observing the manner in which seal failure occured. The following rating schedule was employed to designate the degree and type of failure:

1=complete rupture of polypropylene film
2=internal rupture of coating
3=film rupture with some lifting of coating
4=lifting of coating.

The thickness of the coating is not critical but for optimum results should be from about 0.04 to about 0.1 mil.

The term "RSV" as used herein denotes reduced specific viscosity, which is the specific viscosity divided by concentration of a 0.1% weight/volume solution of polymer in decahydronaphthalene at 135° C.

EXAMPLES 1–8

Oriented stereoregular polypropylene film 0.75 mil thick made from polymer having an RSV of about 2.7 was surface treated by passing the film at about 350 ft. per minutes over a grounded 6-inch diameter roller covered with 15 wraps of 2-mil thick poly(ethylene terephthalate) film and through a pulsating electrostatic discharge between a bar electrode and the roller, the electrode-film (air) gap being 1/16 inch. Electrical power for the discharge was generated by a Lepel HFSG-2 unit, which is basically a high frequency generator consisting of a Tesla coil energized by a spark-gap type oscillatory circuit. Separate portions of the treated film were coated with various nitro-cellulose coating compositions using a #14 Meyer rod, after which each portion was dried at a distance of 7 inches below a bank of 250-watt infrared heaters. The formulations for each example and the adhesion and heat-sealability rating for each are tabulated below in Table I.

*Table I*

| Examples | 1 | 2 | 3 | 4 | 5 | 6 | 7 | 8 [a] | 9 |
|---|---|---|---|---|---|---|---|---|---|
| Coating composition: | | | | | | | | | |
| SS ½ sec. nitrocellulose | 9.8 | 5.6 | 8.4 | 11.2 | 5.6 | 8.4 | 11.2 | 8.4 | 11.2 |
| Dicyclohexyl phthalate | 3.2 | 3.2 | 3.2 | 3.2 | 3.2 | 3.2 | 3.2 | 3.2 | 3.2 |
| α-Terpinene-maleic anhydride reaction product | | 11.2 | 8.4 | 5.6 | | | | | |
| Hexachloroendomethylene tetrahydrophthalic acid | | | | | 11.2 | 8.4 | 5.6 | | |
| Citric acid | | | | | | | | 8.4 | 5.6 |
| Acetone | 68 | 22.4 | 33.6 | 44.8 | 67.2 | 67.2 | 67.2 | 33.6 | 44.8 |
| Ethyl acetate | | 44.8 | 33.6 | 22.4 | | | | | |
| 2B alcohol | | | | | | | | 33.6 | 22.4 |
| Coating adhesion (tape) | (b) | G | G | F-G | G | G | G | P | G |
| Heat sealability rating | (b) | 1 | 1 | 1 | 1-2 | 1-2 | (c) | 2 | 1 |

[a] The coating composition was hazy, denoting incompatibility of the citric acid.
[b] The formulation gave a clear, continuous coating which did not adhere to the film and could not be heat-sealed. The addition of 7 parts of the diethylene glycol ester of the α-terpinene-maleic anhydride reaction product to this formulation gave a coating having very poor "tape" adhesion and a heat-sealability rating of 4.
[c] The coating was not heat sealable denoting insufficiency of thermoplastic material.

EXAMPLES 10–19

The procedure of Examples 1–9 was repeated using various coating compositions containing poly(vinylidene chloride-acrylonitrile) copolymer containing 13 mole percent acrylonitrile instead of nitrocellulose. The formulation for each example and the heat-sealability rating for each are tabulated below in Table II.

*Table II*

| Examples | 10 | 11 | 12 | 13 | 14 | 15 | 16 | 17 [a] | 18 [a] | 19 [a] |
|---|---|---|---|---|---|---|---|---|---|---|
| Coating composition: | | | | | | | | | | |
| Poly(Vinylidene chloride-acrylonitrile) copolymer | 20 | 18 | 16 | 12 | 8 | 16 | 12 | 18 | 16 | 12 |
| α-Terpinene-maleic anhydride reaction product | | 2 | 4 | 8 | 12 | | | | | |
| Hexachloroendoethylene tetrahydrophthalic acid | | | | | | 4 | 8 | | | |
| Citric acid | | | | | | | | 2 | 4 | 8 |
| Acetone | | | | | | | | | 16 | 32 |
| Methyl ethyl ketone | 80 | 72 | 64 | 48 | 32 | 80 | 80 | 80 | 64 | 48 |
| Ethyl acetate | | 8 | 16 | 32 | 48 | | | | | |
| Heat sealability rating | 4 | 4 | 3 | 3 | 1 | 3 | 3 | 3 | 3 | 3 |

[a] The coating composition was hazy, denoting incompatibility.

EXAMPLES 20–28

The procedure of Examples 1–9 was repeated using various coating compositions containing the resinous condensation product of dilinoleic acid and ethylene diamine (average molecular weight 3000–6500 and ball and ring softening point of 105–115° C.) instead of nitrocellulose. The formulation for each example and the adhesion and heat-sealability rating for each are tabulated below in Table III.

*Table III*

| Examples | 20 | 21 | 22 | 23 | 24 | 25 | 26 | 27 [a] | 28 [a] |
|---|---|---|---|---|---|---|---|---|---|
| Coating composition: | | | | | | | | | |
| Dilinoleic acid-ethylene diamine condensate | 20 | 18 | 16 | 12 | 8 | 16 | 12 | 16 | 12 |
| α-Terpinene-maleic anhydride reaction product | | 2 | 4 | 8 | 12 | | | | |
| Hexachloroendomethylene tetrahydrophthalic acid | | | | | | 4 | 8 | | |
| Citric acid | | | | | | | | 4 | 8 |
| Toluene | 48 | 43.2 | 38.4 | 28.8 | 19.2 | 38.4 | 28.8 | 38.4 | 28.8 |
| 2B alcohol | 32 | 28.8 | 25.6 | 19.2 | 12.8 | 25.6 | 19.2 | 25.6 | 19.2 |
| Acetone | | | | | | | 16 | | 32 |
| Ethyl acetate | | | 8 | 16 | 32 | | 48 | | |
| Coating adhesion (tape) | G | G | G | G | G | G | G | P | VP |
| Heat sealability rating | 4 | 3 | 3 | 3 | 3 | 3 | 3 | 2 | 2 |

[a] The coating composition was hazy, denoting incompatiblity.

EXAMPLES 29-37

The procedure of Examples 1-9 was repeated using various coating compositions containing chlorinated rubber (67% by weight chlorine) instead of nitrocellulose. The formation for each example and the adhesion and heat-sealability rating for each are tabulated below in Table IV.

*Table IV*

| Examples | 29 | 30 | 31 | 32 | 33 | 34 | 35 | 36 | 37 |
|---|---|---|---|---|---|---|---|---|---|
| Coating composition: | | | | | | | | | |
| Chlorinated rubber | 8 | 6.4 | 8 | 9.6 | 6.4 | 8.0 | 9.6 | 6.4 | 9.6 |
| Dicyclohexyl phthalate | 2 | 4.0 | 4.0 | 4.0 | 4.0 | 4.0 | 4.0 | 4.0 | 4.0 |
| α-terpinene-Maleic anhydride reaction product | | 9.6 | 8 | 6.4 | | | | | |
| Hexachloroendomethylene tetrahydrophthalic acid | | | | | 9.6 | 8.0 | 6.4 | | |
| Citric acid | | | | | | | | 9.6 | 6.4 |
| Toluene | 90 | 25.6 | 32 | 32 | 25.6 | 32 | 38.4 | 25.6 | 38.4 |
| Acetone | | | | 32 | 38.4 | 32 | 25.6 | 38.4 | 25.6 |
| Ethyl acetate | | 38.4 | 32 | | | | | | |
| Coating adhesion (tape) | VP | G | G | G | G | G | G | (a) | (a) |
| Heat sealability rating | 4 | 2 | 2 | 2 | 2 | 2 | 2 | (a) | (a) | a A continuous film could not be laid down since the chlorinated rubber and the acidic material are not soluble in common solvent systems.

EXAMPLES 38-44

The procedure of Examples 1-9 was repeated using various coating compositions containing poly(vinyl chloride-vinyl acetate) copolymer containing 85-88% vinyl chloride instead of nitrocellulose. The formulation for each example and the adhesion and heat sealability rating for each are recorded in Table V.

*Table V*

| Examples | 38 | 39 | 40 | 41 | 42 | 43 | 44 |
|---|---|---|---|---|---|---|---|
| Coating Compositions: | | | | | | | |
| Poly (vinyl chloride-vinyl acetate) copolymer | 16 | 8 | 13 | 9 | 10 | 12 | 8 |
| Dicyclohexyl phthalate | 4 | 4 | 1 | 2 | | 4 | 4 |
| α-Terpinene-Maleic anhydride reaction product | | 8 | 6 | 9 | 10 | | |
| Tetrahydrophthalic anhydride | | | | | | 4 | 8 |
| Acetone | 80 | 32 | 76 | 72 | 80 | 64 | 64 |
| Ethyl acetate | | 32 | | | | | |
| Coating adhesion | P | G | P | G | G | G | G |
| Heat sealability rating | 4 | 1 | 3 | 1 | 1 | | |

Stereoregular polypropylene which is used in making the film that is coated according to this invention is a known polymer of commerce characterized by a predominant content of crystallizable, stereoregular macromolecules.

The heat sealable polymers that are useful as coatings for stereoregular polypropylene film in accordance with the invention include the vinyl polymers, such as copolymers of vinylidene chloride and acrylonitrile and copolymers of vinyl chloride and vinyl acetate, chlorinated rubbers, nitrocellulose, polyamides, and the like, which are heat sealable at a temperature sufficiently low to avoid loss of orientation or softening of the film when the film is sealed.

The acidic materials that have been found useful for improving the adhesion of heat sealable coatings to stereoregular polypropylene include citric acid, hexachloroendomethylene tetrahydrophthalic acid, and the resinous reaction product of α-terpinene and maleic anhydride. Citric acid and hexachloroendomethylene tetrahydrophthalic acid are readily available articles of commerce. The α-terpinene-maleic anhydride reaction product is a polybasic acid resin complex or adduct comprising essentially 3 - isopropyl-6-methyl-3:6-endoethylene-$\Delta^4$-tetrahydrophthalic anhydride, having an acid number of approximately 530, a molecular weight of approximately 215, and a softening point of 40-50° C. (see Littmann, Ind. Eng. Chem., 28, 1150 (1936)), and is prepared by reacting a terpene cut rich in α-terpinene with maleic anhydride in accordance with the procedure of U.S. 1,993,025. The coating composition can also contain other ingredients, including by way of example, pigments, dyes, plasticizers, and the like, provided they do not detract from the property of sealability. Solid plasticizers such as dicyclohexyl phthalate, triphenyl phosphate, and the like are particularly useful. Liquid plasticizers, however, such as dibutyl phthalate, dioctyl phthalate, and the like prevent adhesion of the coating from developing and are not suitable with the systems of the present invention.

The coatings can be applied to the pretreated film in the form of solutions in any volatile, inert vehicle which is a solvent. Any convenient manipulative technique, such as brushing, rolling, spraying, or dipping, can be employed to coat the film.

What I claim and desire to protect by Letters Patent is:

1. The method of producing heat-sealable, oriented, stereoregular polypropylene film comprising treating at least one surface of said film with an electrostatic discharge to render the surface receptive to printing inks, applying to the treated surface a liquid coating composition comprising a solution in an organic solvent of a thermoplastic film-forming material selected from the group consisting of copolymers of vinylidene chloride and acrylonitrile, copolymers of vinyl chloride and vinyl acetate, chlorinated rubbers, nitrocellulose and polyamides and melting at below about 160° C. and an acidic material selected from the group consisting of citric acid, hexachloroendomethylene tetrahydrophthalic acid, and the resinous reaction product of α-terpinene and maleic anhydride, said acidic material being present in a compatible amount within the range of about 20 to about 60% by weight of the film-forming material, and then drying the coated film.

2. Oriented stereoregular polypropylene film having an adherent heat sealable coating thereon, said coating being produced by treating at least one surface of said film with an electrostatic discharge to render the surface receptive to printing inks, applying to the treated surface a liquid coating composition comprising a solution in an organic solvent of a thermoplastic film-forming material selected from the group consisting of copolymers of vinylidene chloride and acrylonitrile, copolymers of vinyl chloride and vinyl acetate, chlorinated rubbers, nitrocellulose and polyamides and melting at below about 160° C. and an acidic material selected from the group consisting of citric acid, hexachloroendomethylene tetrahydrophthalic acid, and the resinous reaction product of α-terpinen and maleic anhydride, said acidic material being present in a compatible amount within the range of about 20 to about 60% by weight of the film-forming material and then drying the coated film.

References Cited by the Examiner
UNITED STATES PATENTS

| | | | |
|---|---|---|---|
| 2,456,387 | 12/48 | Cooper | 117—161 XR |
| 2,764,509 | 9/56 | Ritson et al. | 117—161 XR |
| 3,041,208 | 6/62 | Hoy et al. | 117—138.8 |
| 3,085,030 | 4/63 | Hendrickson et al. | 117—161 XR |

WILLIAM D. MARTIN, *Primary Examiner.*

RICHARD D. NEVIUS, *Examiner.*